Oct. 15, 1968     E. E. BRUESCHKE     3,406,290
SCANNING DENSITOMETER FOR THERMAL PROFILE ANALYSIS
Filed July 14, 1965     3 Sheets-Sheet 1

INVENTOR.
ERICH E. BRUESCHKE
BY Joseph Levinson
ATTORNEY

Oct. 15, 1968    E. E. BRUESCHKE    3,406,290
SCANNING DENSITOMETER FOR THERMAL PROFILE ANALYSIS
Filed July 14, 1965    3 Sheets-Sheet 2

INVENTOR.
ERICH E. BRUESCHKE
BY *Joseph Levinson*
ATTORNEY

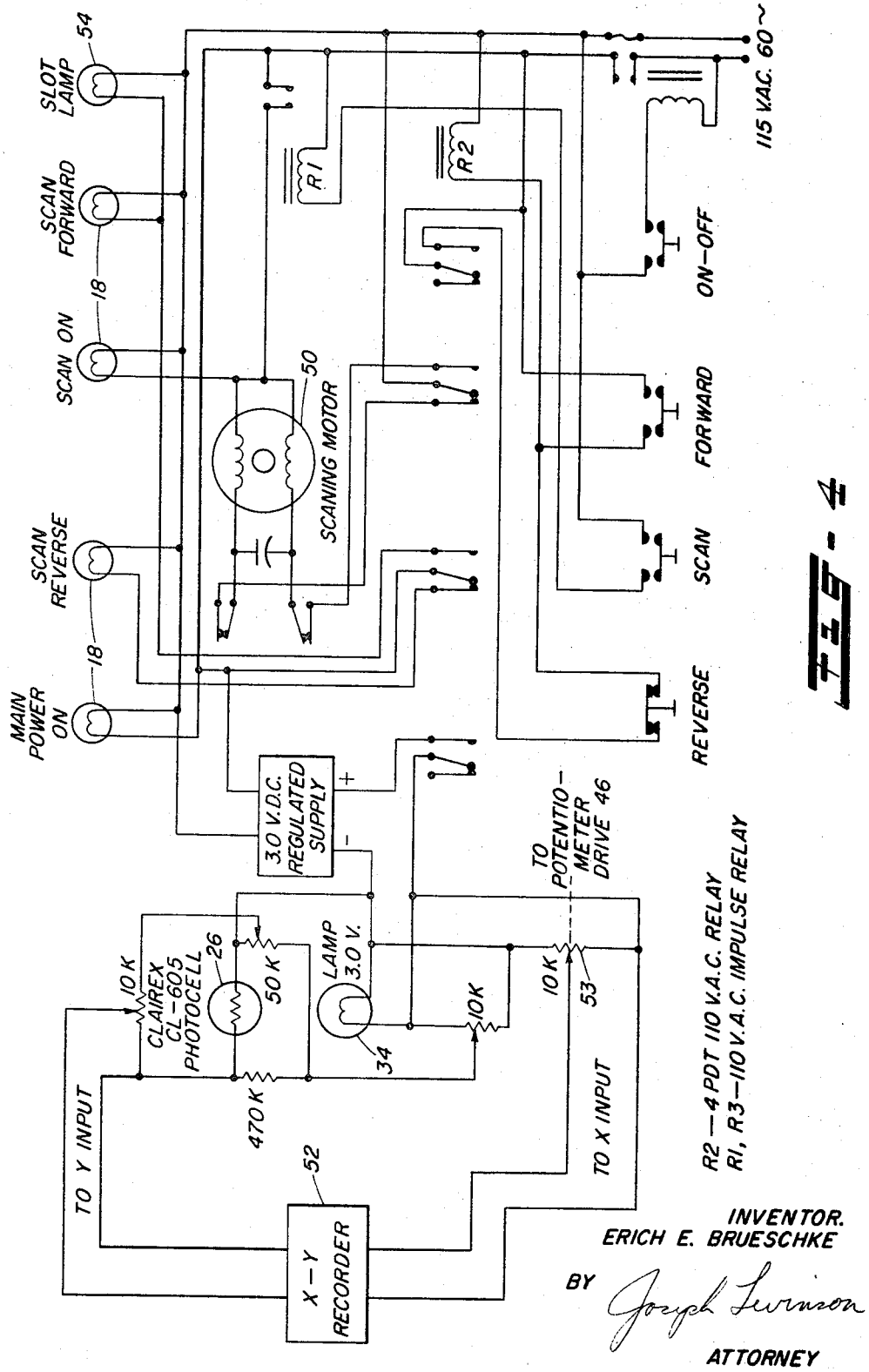

United States Patent Office 3,406,290
Patented Oct. 15, 1968

3,406,290
SCANNING DENSITOMETER FOR THERMAL PROFILE ANALYSIS
Erich E. Brueschke, Philadelphia, Pa., assignor to Barnes Engineering Company, Stamford, Conn., a corporation of Delaware
Filed July 14, 1965, Ser. No. 471,866
4 Claims. (Cl. 250—219)

This invention relates to an improved densitometer for analyzing photographic images, and more particularly to a scanning densitometer which permits analyzing a continuous range of small contralateral areas on a photographic image.

A densitometer is a device for measuring the density of a photographic image, either in the form of a negative or of a photographic print, and generally includes passing a visible source of radiation through the material on which the photographic image appears onto a radiation detector. The output of the radiation detector is applied to a suitable indicating means, such as a meter, for reading the density of the print in accordance with the amount of light passing through the print. Although the present invention has general application to analysis of photographic images in various forms, it will be described hereinafter with respect to infrared thermography, and even more particularly with respect to thermography of the human body. In thermography of the human body, a thermal image, called a thermogram, of the surface temperature of the human body is produced by an infrared camera, for example, by a Barnes Thermograph. Thermograms of the human body are finding use as an adjunct for medical diagnosis. The success, of course, in the use of thermograms of the human body in medical diagnosis depends, in a large measure, upon the degree in which physicians are able to interpret the results, and relate these results to diseases. In the case of a thermogram of the human body, it would be incumbent upon the physician to accurately and quickly determine the temperatures of various areas on the thermogram.

Among the practical problems which arise in the interpretation of thermograms are the inability of the human eye to detect changes in grayness of the thermal image accurately, and the inability to directly perceive the temperature difference represented by the black-to-white range of the thermal image.

Early thermograms were not calibrated, and then were provided with a step-type gray scale which was produced by photographing on the thermogram a plurality of blackbody reference sources of known temperature in a given temperature range, for example as is shown and described in application Ser. No. 272,477 entitled "Calibration for Thermal Image System," which is assigned to the assignee of the present application. The thermograms produced as above were then interpreted with the naked eye. It was soon found that comparison of film density of areas of the thermal image of the human body with the gray scale images using the naked eye was unreliable. A densitometer, for example of the type shown and described in application Ser. No. 352,180 entitled "Negative and Print Densitometer" which is assigned to the assignee of the present invention, was used to analyze the density or light transmittance of small areas of the thermograph which were compared to the density of the known temperature gray scale which was recorded on the thermogram at the same time that a patient was being photographed. Although this point-by-point method of analysis is accurate, a good perception of how the temperature of the body varies between contralateral areas is not readily available using such an analysis.

Accordingly, it is an object of this invention to provide an improved densitometer for analyzing thermograms which readily provides the heat pattern of contralateral areas, allowing gradual changes in temperature to be perceptible.

A further object of this invention is to provide an improved densitometer for improving the analysis of thermograms which is simple, rugged, accurate, and easy to operate.

In carrying out this invention, a scanning densitometer is provided which is adapted to present in graphic form temperature vertically versus distance horizontally on the thermogram. In this way, gradual changes of temperature from one part of the thermogram to another, which could not be appreciated with visual or point-to-point analysis, are made readily perceptible.

The invention, both as to organization and method of operation, together with further objects and advantages thereof, may best be understood by reference to the following description taken in connection with the accompanying drawing, in which:

FIG. 4 is an electrical schematic of the scanning densitometer.

Figure 1:
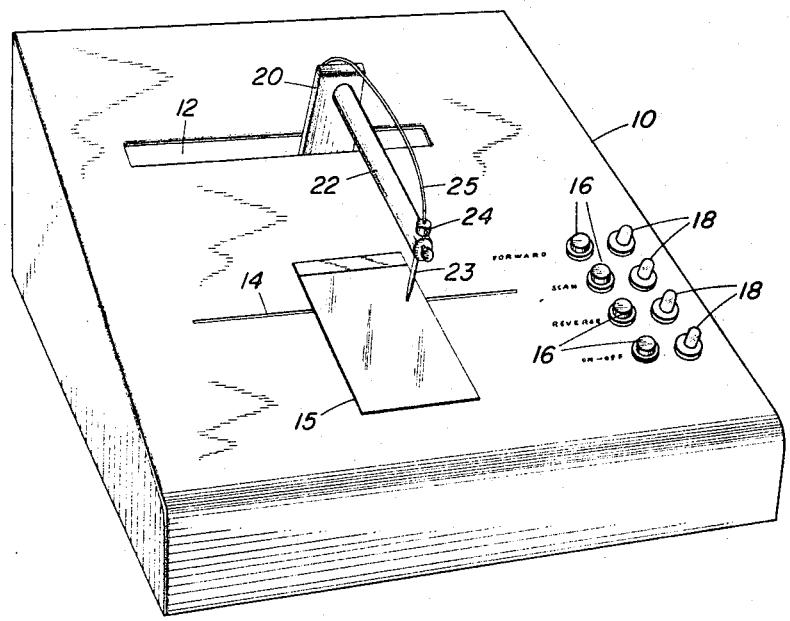
FIG. 1 shows an isometric top view of a scanning densitometer as embodied in this invention.
Figure 2:
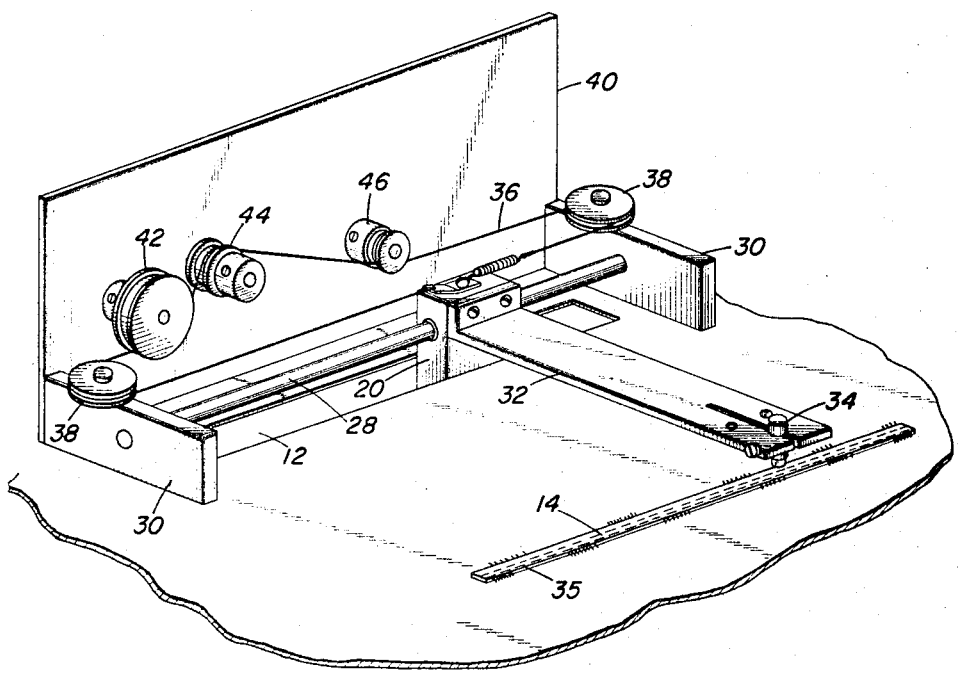
FIG. 2 is a bottom view of FIG. 1 in which the electrical apparatus is removed and the case is shown broken for purposes of illustration.

Referring now to FIGS. 1 and 2, the scanning densitometer as embodied in this invention is enclosed in a cabinet 10 having parallel slots 12 and 14 therein. A thermogram to be examined is positioned over the narrow slot 14, and remains stationary during the scanning procedure. If desired, the thermogram may be held in place by tape or any other suitable means. Mounted on the top of the cabinet are four push-button switches 16 which control the scanning motor power, the scanning motor direction, and the application of power to the densitometer. Also included on the top of the panel are four signal lights which indicate which of the switches have been operated. A support column is positioned to move in the wider slot 12. A detector scanning arm 22 is mounted on one end thereof to the support column 20, and has mounted in the other end thereof a light guide holder which contains a fiber optic light guide 25, for example American Optical Company type LG–1. The light guide 25 is secured in the light guide holder 23 by an adjustment rod 24 which compresses the light guide 25 when the slotted end of holder 23 is screwed into rod 24. As is best seen in FIG. 2, the support column 20 is mounted to be driven on a rod 28 which is held by end supports 30. On the under side of the cabinet 10 and mounted on the support column 20 is a lamp support arm 32 having a lamp 34 mounted therein under the slot 14 and an alignment with the light guide holder 23 on the top of the cabinet 10. The under side of the slot 14 is covered by a transparent plastic screen 35, which is recessed so as to mount flush with cabinet 10. The entire slot is illuminated by slot lamp 54 (FIG. 4) which facilitates thermogram placement.

Mounted on a motor drive plate 40 are a motor drive wheel 44, an idler gear 42, and a potentiometer drive 46. The scanning motor drive wheel 44 causes horizontal movement of the column 20, and accordingly the lamp 34 and light guide holder 23, through the use of a cord 36 and pulley 38 arrangement.

In the electrical schematic of FIG. 4 there is shown a reversible scanning motor 50 together with its controls which are believed to be self-explanatory. The light detector 26 is connected as an arm of a conventional Wheatstone bridge, with the output of the Wheatstone bridge being fed to the Y input of a conventional X–Y recorder 52, for example, model HR96 of Houston Instrument Corp. The X input to the X–Y recorder is taken from a potentiometer 53 which is driven by the potentiometer drive 46.

In operation, a thermogram 15 is placed in position on the top of the cabinet 10 over the narrow slot 14. The transparent slot 14 is transilluminated from below by the light source 34. Light passing through a small area of the thermogram 15 is picked up by the small fiber optic light guide 25 and applied to the detector 26. The light source 34 and the fiber optic light guide 25 move together across the thermogram 15 using the constant speed cord 36 and pulley 38 driven by the motor 50. This assures a constant light intensity regardless of the position of the detector scanning arm 22. The light guide 25 receives light on the order of a .02" diameter area on the thermogram, and this light is guided by glass fibers onto the detector 26, and signals appearing on the detector are applied to the Y input of the X–Y recorder 52. This procedure directly relates the density of the thermogram in the form of a vertical signal on the X–Y recorder. The horizontal movement of the detector scanning arm 22 also produces an X input to the X–Y recorder 52, which adds the horizontal direction to relate the thermogram film density to a horizontal position thereon.

Although a photoconductive cell is shown for the detector 26, any other form of suitable detector may be used, for example such as a photomultiplier tube. The use of such a detector would increase the capabilities of scanning speed, which would then only be limited by the recorder response.

Figure 3:
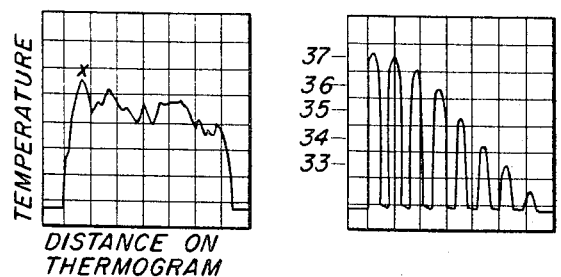
FIG. 3 shows graphs of temperature versus distance which are produced using the scanning densitometer of this invention.

The above operation produces on the X–Y recorder 52 a single-line scan of a thermogram, which may be termed a "thermal profile." FIG. 3 illustrates the results of such a scan and how the information may be used. The graph on the right of FIG. 3 is the thermal profile of the gray scale appearing on the thermograph, and it is scanned first. Knowing the temperatures of the known black body sources which produce the gray scale on the thermogram provides a positive relationship between temperature and film density. Then the area of interest on the thermogram of the patient is scanned, as is shown on the left of FIG. 3. Temperature measurements are then easily made by referring to the thermal profile of the gray scale. Being armed with information of what normal thermal profiles would be for given areas of the human body, and comparing thermal profiles with the normal condition provides an added aid in developing diagnostic techniques. For example, FIG. 3 shows an assymetrical area (marked with an X) of temperature increase.

The thermal profile analysis which is made available by the present invention, using existing thermograms, makes temperature differentials directly available and allows gradual changes in temperature to be appreciated, which might otherwise be lost when relying on point-to-point methods or by visual inspection. Since the thermal image has already been recorded on the thermogram, the thermal profile can be made utilizing the present invention at any time subsequent to the taking of the thermogram. This has the advantage of not tying up technicians to particular times for making the thermal analysis. The thermal profile as provided in the present invention may be compared to later-taken thermal profiles of the same area for assessing response to therapy. The fact that the thermograms are analyzed in one form by comparing contralateral areas suggests the possibility of a routine screening of the thermograms utilizing the present invention, and then using computer analysis on the thermal profiles produced therefrom. Furthermore, serial thermal profiles can be made and used as a permanent record of the patient's temperature profile. For diagnostic purposes this may be of considerable value in the evaluation of subsequent changes caused by disease which occurred after the original thermal profiles were made.

The scanning densitometer offers a thermal profile analysis of thermograms which adds a much needed direct perception of absolute temperature and temperature change. It removes the limitations of point-by-point temperature measurement and the inaccuracy of visual examination, and makes additional information on contralateral changes in temperature directly available.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A scanning densitometer for analyzing thermograms to determine how temperature varies along a line in a thermogram comprising in combination
    (a) a housing having a flat surface with a long, narrow slot therein the length of which at least corresponds to the longest dimension of the thermogram which is to be examined by the densitometer,
    (b) a radiation detector,
    (c) a light guide positioned above said slot, said light guide being coupled to said radiation detector,
    (d) a light source positioned under said slot and in alignment with said light guide,
    (e) drive means for simultaneously moving said light source and said light guide along said slot,
    (f) electrical means associated with said drive means for deriving a signal indicative of the position of said light guide with respect to distance along said slot, and
    (g) circuit means including said radiation detector for deriving a signal in accordance with the film density of a thermogram which is being examined by said densitometer.

2. The scanning densitometer as set forth in claim 1 wherein said drive means is an electrical motor.

3. The scanning densitometer as set forth in claim 2 wherein said flat surface contains a second slot parallel to said narrow slot and has mounted for movement therein a support column which is driven in said second slot by said electrical motor, said light source and light guide being mounted in alignment on said support column.

4. A scanning densitometer for analyzing the temperatures of a range of small contralateral areas on a thermogram comprising in combination
    (a) a housing having a flat surface adapted to accommodate thermograms which are to be analyzed thereon and first and second parallel slots extending along said surface,
    (b) a support column mounted for movement in said first slot,
    (c) a scanning arm having one end thereof mounted on said support column above said flat surface and a light guide on the other end thereof which is positioned above said second slot by said scanning arm,
    (d) a radiation detector coupled to said light guide,
    (e) a lamp support arm mounted on one end thereof to said column on the underside of said flat surface and carrying on the other end thereof a source of illumination which is positioned by said support arm under said second slot in alignment with said light guide,
    (f) motor drive means for moving said support column in said slot,
    (g) electrical means associated wtih said motor drive means for deriving a signal indicative of the position of said column in said first slot, and
    (h) circuit means including said detector for deriving a signal in accordance with the film density of the thermogram being analyzed.

No references cited.

RALPH G. NILSON, *Primary Examiner.*

T. N. GRIGSBY, *Assistant Examiner.*